(12) United States Patent
Chung et al.

(10) Patent No.: US 10,123,615 B2
(45) Date of Patent: Nov. 13, 2018

(54) MODULAR STORAGE UNIT

(71) Applicant: Jetmax Ltd., Shatin, NT (HK)

(72) Inventors: Stephen Cheung Kam Chung, Shatin (HK); Daniel S. Keating, Forth Worth, TX (US)

(73) Assignee: Jetmax Ltd., Shatin, NT (HK)

( * ) Notice: Subject to any disclaimer, the term of this patent is extended or adjusted under 35 U.S.C. 154(b) by 4 days.

(21) Appl. No.: 15/073,230

(22) Filed: Mar. 17, 2016

(65) Prior Publication Data

US 2017/0055700 A1 Mar. 2, 2017

Related U.S. Application Data

(60) Provisional application No. 62/209,114, filed on Aug. 24, 2015.

(51) Int. Cl.
| | |
|---|---|
| *A47B 47/00* | (2006.01) |
| *A47B 47/04* | (2006.01) |
| *F16B 12/46* | (2006.01) |
| *F16B 5/06* | (2006.01) |

(52) U.S. Cl.
CPC ........ *A47B 47/0033* (2013.01); *A47B 47/042* (2013.01); *F16B 5/0614* (2013.01); *F16B 12/46* (2013.01)

(58) Field of Classification Search
CPC ............ A47B 47/0091; A47B 47/0075; A47B 47/0033; A47B 47/042; F16B 12/20; F16B 12/44; F16B 2012/446; F16B 5/0614; F16B 12/46; F16M 1/00; F16M 7/00; Y10T 29/49826; Y10T 403/42

USPC ......................................................... 211/194
See application file for complete search history.

(56) References Cited

U.S. PATENT DOCUMENTS

| | | | | |
|---|---|---|---|---|
| 1,247,443 | A | | 11/1917 | Nones |
| 1,645,421 | A | * | 10/1927 | Gloekler ................. F16B 12/46 248/188 |
| 2,168,911 | A | * | 8/1939 | Meyer ..................... A47F 5/005 217/69 |
| 2,547,112 | A | * | 4/1951 | Daniels .................. B65D 19/16 108/55.1 |
| 2,549,509 | A | * | 4/1951 | Munroe .................... B65D 9/12 217/12 R |
| 2,729,355 | A | * | 1/1956 | Gaston ................. B65D 88/528 217/12 R |
| 2,894,308 | A | | 7/1959 | Eckstein |
| 2,956,705 | A | * | 10/1960 | Clingman .......... A47B 47/0008 217/12 R |
| 3,362,739 | A | | 1/1968 | Staeger et al. |
| 3,760,465 | A | | 9/1973 | Brennan |
| 3,836,217 | A | * | 9/1974 | Shiina ................ A47B 47/0041 312/107 |

(Continued)

*Primary Examiner* — Ko H Chan
(74) *Attorney, Agent, or Firm* — Amster, Rothstein & Ebenstein LLP (57) ABSTRACT

A modular storage unit which can be assembled with the use of coupler clips without using permanent fastening means such as nails or glue or tape. The side and top walls are assembled and kept in place through the use of coupler clips which prevent the panels from moving laterally or transversely. An optional back panel may be kept in place through the use of grooves in the side and top panels. Connector pins permit the modular storage units to be stacked horizontally and/or vertically. The modular storage units may have various configurations.

12 Claims, 6 Drawing Sheets

(56) References Cited

U.S. PATENT DOCUMENTS

| | | | | |
|---|---|---|---|---|
| 3,836,218 A * | 9/1974 | Hallal | ................ | A47B 47/0041 312/108 |
| 3,913,289 A | 10/1975 | Recker | | |
| 3,989,397 A | 11/1976 | Baker | | |
| 3,998,509 A * | 12/1976 | Hauser | ................ | A47B 47/0033 24/341 |
| 4,210,274 A * | 7/1980 | Leonard | ................ | B65D 5/006 229/198.1 |
| 4,318,628 A * | 3/1982 | Mancini | ............ | A47B 47/0033 403/231 |
| 4,618,120 A * | 10/1986 | Wattles | .................. | F16B 12/20 211/189 |
| 4,712,942 A | 12/1987 | Brown | | |
| 4,753,376 A | 6/1988 | Tulio | | |
| 4,757,909 A | 7/1988 | Matsuura | | |
| 4,779,751 A | 10/1988 | Munroe | | |
| 4,880,284 A * | 11/1989 | Dickson | ................ | A47B 67/04 312/257.1 |
| 5,399,044 A * | 3/1995 | Gilb | ........................ | E04B 1/26 403/170 |
| 5,429,259 A * | 7/1995 | Robin | ...................... | B65D 9/06 217/65 |
| 5,466,057 A | 11/1995 | Blankenburg | | |
| 5,647,181 A * | 7/1997 | Hunts | .................... | A63H 33/10 312/111 |
| 5,676,486 A | 10/1997 | Keith | | |
| 5,806,265 A * | 9/1998 | Sluiter | ...................... | E04B 1/58 52/643 |
| 6,050,015 A | 4/2000 | Lurie | | |
| 6,718,709 B2 | 4/2004 | Koutras et al. | | |
| 6,935,085 B2 * | 8/2005 | Little, Jr. | .............. | E04B 2/7854 52/285.1 |
| 7,967,401 B2 * | 6/2011 | Hsu | .................... | A47B 47/0008 312/108 |
| 8,147,009 B1 | 4/2012 | Rider | | |
| 8,616,661 B2 * | 12/2013 | Takata | .................... | H02B 1/28 174/50 |
| 8,926,030 B2 * | 1/2015 | Roth | ........................ | H02B 1/01 312/111 |
| 9,038,261 B2 * | 5/2015 | Renaud | ................... | B25B 5/142 29/525.01 |
| 9,089,212 B2 | 7/2015 | Chang | | |
| 9,414,985 B2 * | 8/2016 | Ugartechea Berlanga | .................. | A61G 99/00 |
| 2009/0166356 A1 | 7/2009 | Tsai | | |
| 2012/0122368 A1 | 5/2012 | Jensen | | |
| 2012/0294675 A1 * | 11/2012 | Chang | ................... | A47B 47/0016 403/354 |
| 2013/0074401 A1 | 3/2013 | Forno | | |

\* cited by examiner

MODULAR STORAGE UNIT

CROSS-REFERENCE TO RELATED APPLICATION

This application claims the priority of and benefit to U.S. Provisional Patent Application No. 62/209,114, filed on Aug. 24, 2015, the entire contents of which are incorporated by reference herein.

FIELD OF THE INVENTION

The present invention relates generally to a modular storage assembly and more particularly to a modular storage unit comprising removable coupler clips containing tongues and panels designed with corresponding grooves to create open-faced cubes or other rectangular prisms without the use of fastening means such as nails, screws, glue or the like. Connector pins can be inserted into the coupler clips to permit the modular storage units to be securely stacked vertically or horizontally.

BACKGROUND OF THE INVENTION

There has been a long-standing desire to create simple, efficient, cost-effective and aesthetically pleasing modular storage systems that permit an individual to easily assemble and disassemble such storage units without the use of screws, nails, glue or other permanent fastening means. One such early system for the creation of display cases issued in 1917 as U.S. Pat. No. 1,247,443. Other examples of modular storage systems can be found in U.S. Pat. Nos. 3,362,739, 3,913,289, 4,712,942 and U.S. Patent Publication No. 2009/0166356.

SUMMARY OF THE INVENTION

At least eight coupler clips and four panels are provided to create a modular storage unit that does not require tools for assembly. Each coupler clip holds two panels firmly in place in a substantially perpendicular relationship. The panels align so that they are touching or in close proximity without any structure between them. There are pre-cut grooves in the panels that correspond to tongues and extrusions on the coupler clip to provide a tight and secure fit. The design of the clips prevents lateral or upward motion once the clips are securely engaged. Thus, the modular storage unit may be assembled without the use of any permanent connecting means.

When the modular storage unit contains a back panel, the back panel need not engage with the connector clips but instead may be secured in place within grooves in the surrounding side and top panels. If the height of the side panels is substantially the same as the width of the top and bottom panels, the back panel would be square. As the relative size between the height of the side panels and the widths of the top and bottom panels varies, the optional back panel may vary from square to rectangular in shape. If the side panels are of substantially the same dimension as the back panel, a storage cube is created. Alternatively, if the width of the side panels remains the same size as the back panel but the length is of a longer dimension, then a rectangular prism is formed. If the back panel is of rectangular shape and the side and top panels are shaped correspondingly, a rectangular storage unit is provided.

In one embodiment, the coupler clips each have a small hole which accepts a connector pin allowing multiple storage units to be connected together. In this embodiment, connector pins can be used to stack multiple units vertically or to connect multiple units horizontally to create a lattice of interconnected storage units. The connector pins and corresponding holes can be of varying shape. In one embodiment the connector pins are octagonal prisms and the small hole that accepts the connector pin is similarly octagonally shaped. Alternatively, if a more permanent construction of the cube is desired, a screw or other fastener can be used in each hole in place of the connector pin or a second hole can be incorporated in each coupler clip. With this alternate embodiment, a connector pin can be used in the first hole and the optional fastener can be used in the second hole, or the reverse.

In one embodiment, the side panels contain grooves which permit the insertion of horizontal shelves within the modular storage unit to section off the modular storage unit into multiple sections. Alternatively, instead of grooves in the side panels, holes can be drilled through the side panels to be aligned with similarly located pilot holes in the shelves so that the shelves can be connected through the placement of small dowels (or a fastener) in the respective holes. Alternatively, the storage unit can be fitted with a plurality of holes in the inside faces of the side panels and conventional pins can be placed in the appropriate holes to support one or more shelves.

In one embodiment, the top and bottom panels contain grooves which permit the insertion of vertical dividers within the modular storage unit to section off the modular storage unit into multiple sections. Alternatively, instead of grooves in the top and bottom panels, holes can be drilled in the top and bottom panels to be aligned with similarly drilled pilot holes in the dividers so that the dividers can be connected through the placement of small dowels (or a fastener) in the respective holes.

According to an exemplary embodiment of the present invention, there is provided a coupler clip for connecting a first and second panel of a modular storage unit substantially perpendicular to each other wherein each panel has a thickness. The coupler clip has an inner wall having a length wherein the length of the inner wall has a first segment and a second segment which form an angle of approximately 90 degrees at their intersection. The coupler clip has an outer wall having a length wherein the length of the outer wall has a first segment and a second segment which form an angle of approximately 90 degrees at their intersection. Alternatively, the first and second segment of the inner wall and the first and second segment of the outer wall can form any angle less than 360 degrees, provided that the angles formed by the inner and outer walls are substantially equal.

The inner and outer walls of the coupler clip contain inner and outer surfaces, with the inner wall of the outer surface facing the inner wall of the inner surface. The inner surfaces of the first and second segments of the inner and outer walls are spaced from each other a distance substantially equal to the thickness of the respective first and second panels of the modular storage unit. The inner surface of the inner wall contains at least one projecting tongue on the first segment of the inner wall, and at least one projecting tongue on the second segment of the inner wall, with both tongues facing the inside of the outer wall. The inner surface of the outer wall contains at least one projecting tongue on the first segment of the outer wall, and at least one projecting tongue on the second segment of the outer wall, with both tongues facing the inside of the inner wall. The coupler clip also contains a cap which is integrally formed with one end of the inner and outer walls.

According to an exemplary embodiment of the present invention, there is provided a modular storage unit having two side panels, and a top panel and a bottom panel of equal dimensions. The modular storage unit has eight coupler clips as described above. The side panels contain grooves which are configured to receive the coupler clip tongues located on the inner surface of the inner wall and the inner surface of the outer wall of each coupler clip. The panels are desirably of the same thickness, but varying thicknesses, with the coupler clips sized accordingly, are possible.

It is anticipated and within the scope of the invention that a storage unit may have neither shelves nor dividers or that any number of horizontal shelves or vertical dividers may be used to create varying amounts of shelves or cubbyholes.

It is anticipated and within the scope of this invention that the coupler clips, panels, and connector pins can be made of various materials so long as the function of the modular storage unit remains the same. Exemplary materials for the coupler clips include plastic, nylon, ABS, polypropylene, polystyrene, metal and the like.

It is also anticipated that someone of ordinary skill in the art would be able to create modular storage units of other sizes (e.g., a triangular prism) using the tongue and groove connector system disclosed herein.

These and other features of this invention are described in, or are apparent from, the following detailed description of various exemplary embodiments of this invention.

BRIEF DESCRIPTION OF THE DRAWINGS

Exemplary embodiments of this invention will be described with reference to the accompanying figures wherein.

DETAILED DESCRIPTION OF THE EXEMPLARY EMBODIMENTS

Figure 1A:
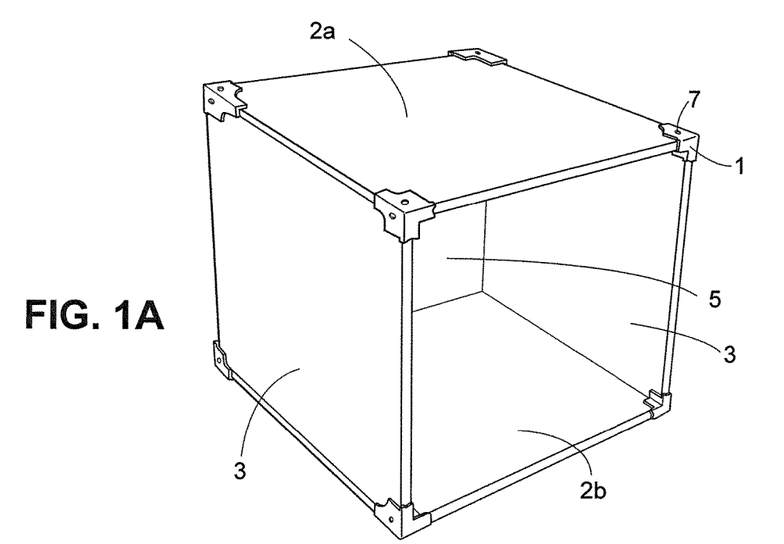
FIG. 1A is a perspective view of one assembled modular storage unit.
Figure 4:
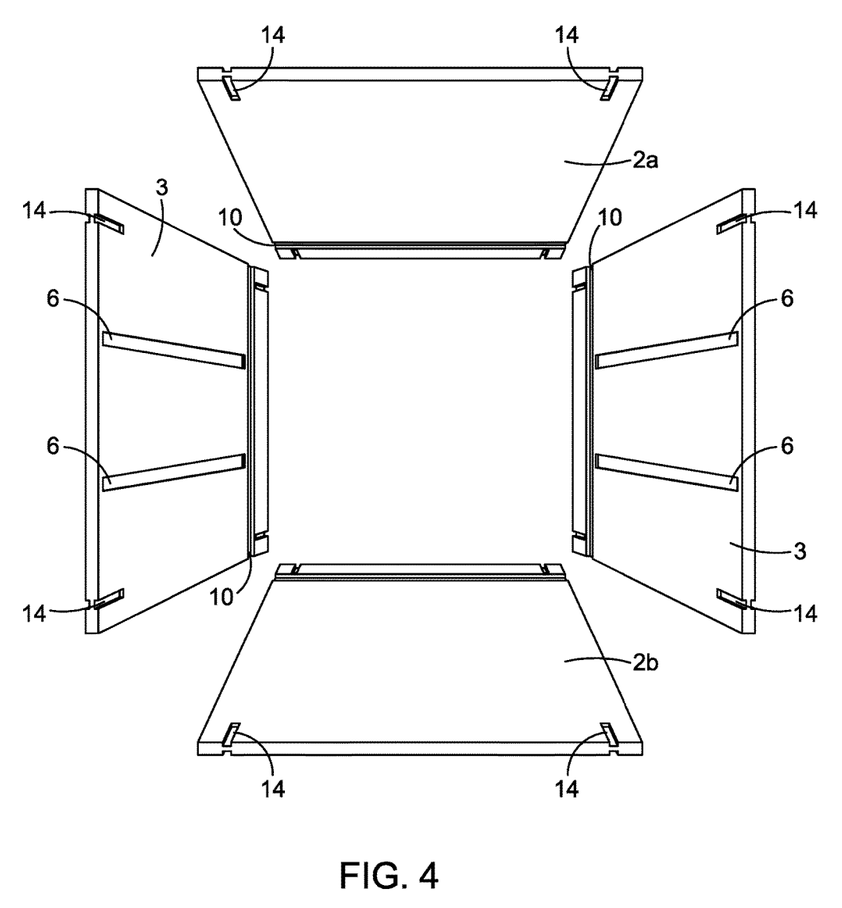
FIG. 4 is an exploded view of the top, bottom and side panels of the modular storage unit prior to assembly.

Initially referring to FIG. 1A for the structure of the present invention, the embodiment of the modular storage unit described herein includes top and bottom panels 2a and 2b and side panels 3 joined together using coupler clips 1. The top, bottom and side panels 2a, 2b, 3, 3, are preferably the same thickness but may be of different thicknesses. Each coupler clip 1 may have two holes or bores 7 on the top and side of coupler clip 1 to receive connector pin 8, shown in FIG. 1B, to join the modular storage units either vertically or horizontally. Back panel 5 is secured in place by sliding into grooves present in side panels 3, 3 bottom panel 2b and top panel 2a. Optionally, as shown in FIG. 4, side panels 3, 3 may contain grooves 6 to hold optional shelving within the modular storage unit.

Figure 1B:
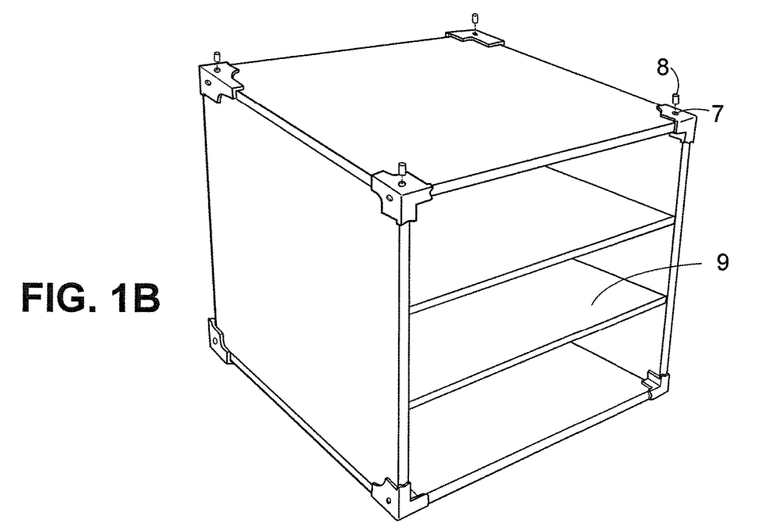
FIG. 1B is a perspective view of one assembled modular storage unit including additional shelving panels and with connector pins present to enable this modular storage unit to be connected vertically to another.

Referring to FIG. 1B, the modular storage unit is shown with optional shelves 9 in place. Optionally, one or more dividers (not shown) can be placed in perpendicular alignment with optional shelves 9 to create multiple storage cubbies. A connector pin 8 is shown in each of the four bores 7 on the top of the box to accommodate the vertical stacking of another modular storage unit and prevent lateral movement of one storage unit relative to the other. Connector pin 8 is optional and need not be used when no box will be stacked on top of the box shown in FIG. 1B.

Figure 1C:
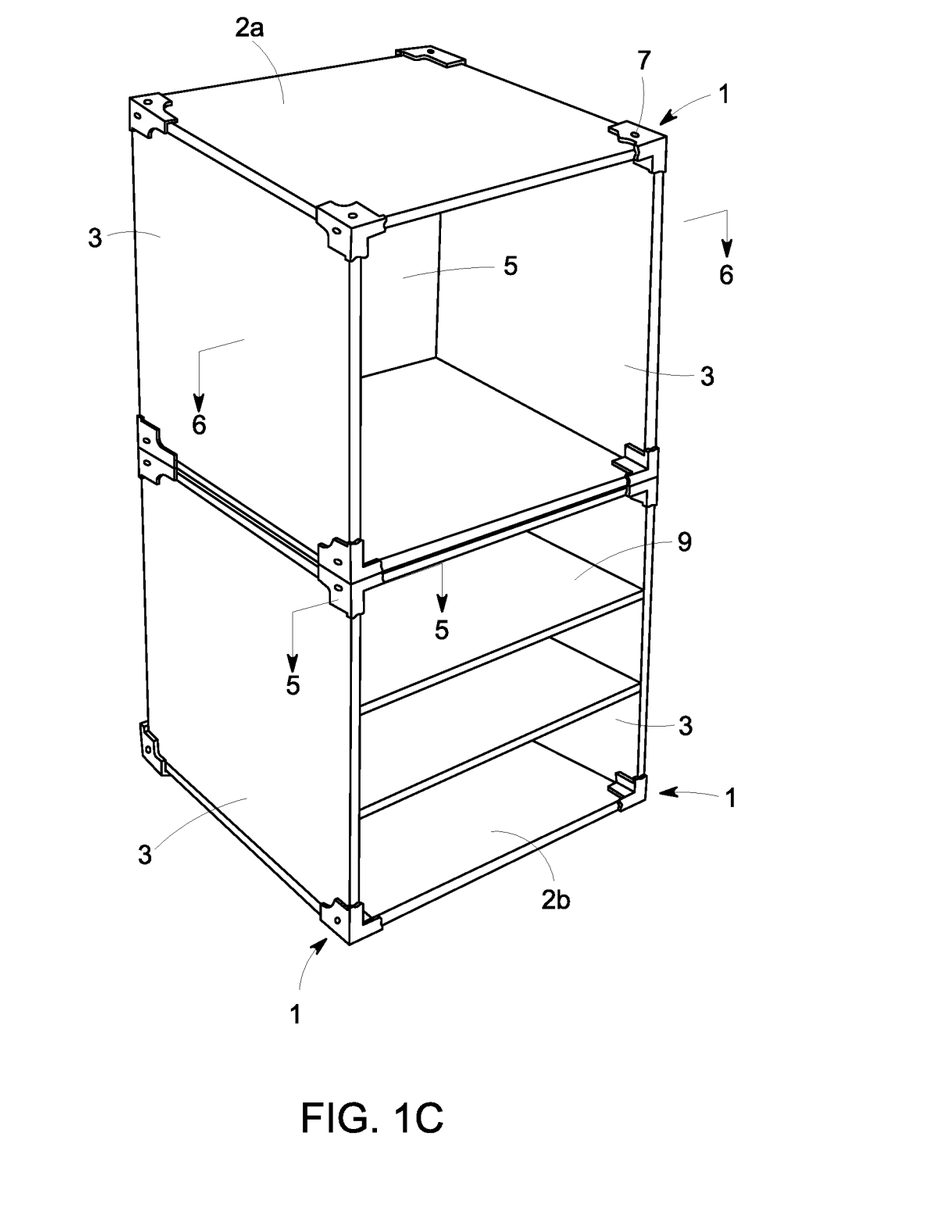
FIG. 1C is a perspective view of the modular storage unit shown in FIG. 1A connected to the modular storage unit shown in FIG. 1B.

FIG. 1C illustrates the two modular storage units shown in FIGS. 1A and 1B vertically stacked. Optional shelves 9 are present in the bottom modular storage unit. The top modular storage unit is shown without grooves 6 in side panels 3, 3 illustrating an embodiment where the modular storage unit does not include optional shelves 9.

Figure 2A:
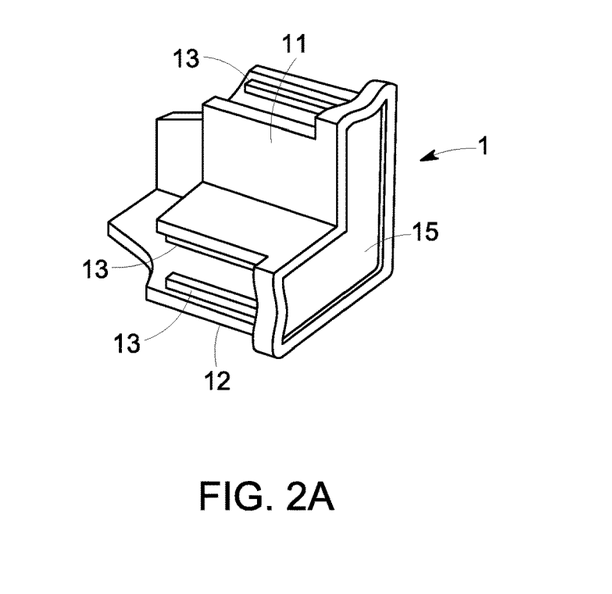
FIGS. 2A and 2B are perspective views of the coupler clip.
Figure 2B:
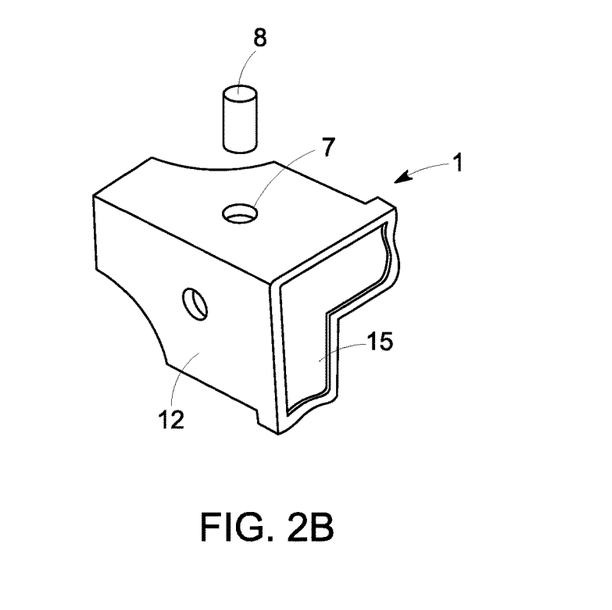

Referring now to FIGS. 2A and 2B, two perspective views of coupler clip 1 are shown. Inner walls 11 and outer walls 12 each contain longitudinally extending tongues 13 which are designed to slidably engage grooves 14 on panels 2a, 2b, 3 and 3, best shown in FIGS. 4 and 5, when coupler clip 1 is engaged. The interaction between the tongues 13 and the grooves 14 ensure a secure fit and prevent the panels 3, 3 from moving in the upward or downward direction relative to the top and bottom two panels 2a and 2b. End cap 15 of coupler clip 1 ensures the coupler clip remains fixedly engaged at a corner where the panels connect. Bore 7 is shown on coupler clip 1 of FIG. 2B. Connector pin 8 is also shown ready to be inserted into bore 7, if required. In one embodiment, connector pin 8 is shaped as an octagonal prism and bore 7 has an octagonal opening to engage with connector pin 8; however any suitable cross-sectional shape can be utilized.

Figure 3A:
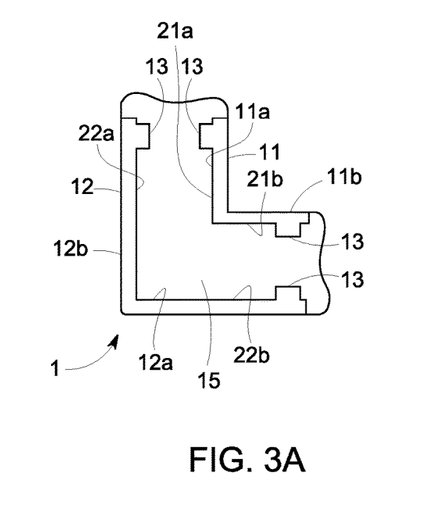
FIG. 3A is a back view of the coupler clip.

FIGS. 3A-3D illustrate four additional views of coupler clip 1. FIG. 3A illustrates inner surface 11a and outer surface 11b of inner wall 11 and inner surface 12a and outer surface 12b of outer wall 12. Inner wall 11 and outer wall 12 are parallel to each other. Each have two sections aligned perpendicularly. Inner wall 11 is formed from two segments, 21a and 21b. The first segment 21a of inner wall 11 is oriented at approximately a right angle to the second segment 21b of inner wall 11, forming an "L" shape. Similarly, outer wall 12 is formed from two segments 22a and 22b. The first segment 22a of outer wall 12 is oriented at approximately a right angle to the second segment 22b of outer wall 12 forming an "L" shape.

Figure 3B:
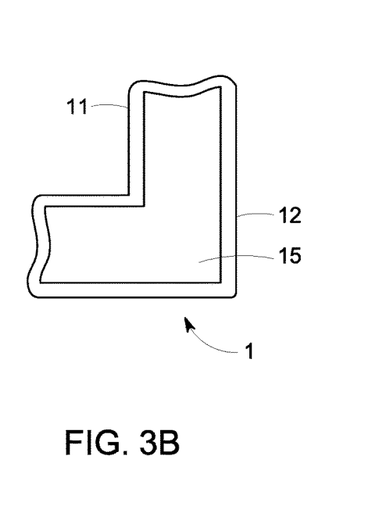
FIG. 3B is a front view of the coupler clip.
Figure 3C:
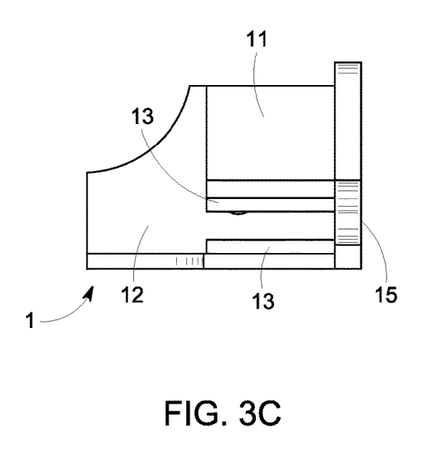
FIG. 3C is a side view of the coupler clip.
Figure 3D:
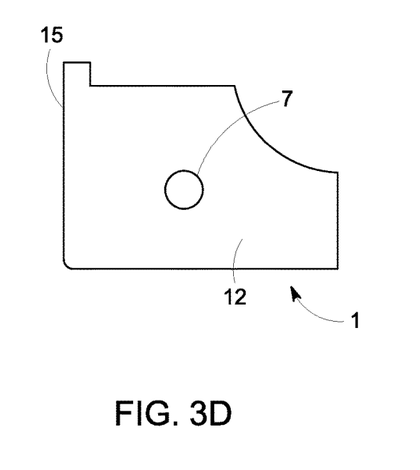
FIG. 3D is a top view of the coupler clip.

The inner surface 11a of inner wall 11 and the inner surface 12a of outer wall 12 are spaced apart a distance about equal to the thickness of panels 2a, 2b, 3, or 3. As best shown in FIG. 3A, at least one tongue 13 is located on each section of inner surface 11a of inner wall 11 and inner surface 12a of outer wall 12. Tongues 13 slidably engage the grooves 14 in panels 2a, 2b and 3, 3 to ensure a secure fit and to prevent adjacent panels from separating. Cap 15 is integral with coupler clip 1 at one end of inner wall 11 and outer wall 12 to provide stiffness and to keep coupler clip 1 in position at a corner of the modular storage unit. The tongues 13 are each substantially perpendicular to the cap 15. FIG. 3B shows the front of coupler clip 1 which may be decorative, finished to blend with or contrast the color of the panels. Cap 15 covers the space between inner wall 11 and outer wall 12 and the edges of cap 15 can be flush with the outer surface of inner wall 11 and the outer surface of outer wall 12 to provide a smooth decorative appearance. FIG. 3C shows the side of coupler clip 1 and further illustrates tongues 13 on the inner surfaces of inner wall 11 and outer wall 12. In FIG. 3D bore 7 is visible into which connector pin 8 can be placed to permit the joining of more than one modular storage unit.

Alternatively, coupler clip 1 can be constructed with one tongue 13 on the inner surface of the first segment of either inner wall 11 or outer wall 12 and a second tongue 13 on the second segment of either inner wall 11 or outer wall 12. In such a construction, the single tongue on the first and second segments of either inner wall 11 or outer wall 12 in cooperation with the opposite wall retain the panels (not shown) in engagement. Other configurations with additional tongues 13 are also possible. For example, coupler clip 1 can be constructed with one tongue 13 on each segment of the inner surfaces of inner wall 11 and outer wall 12.

Alternatively, the first and second segment of the inner wall and the first and second segment of the outer wall can form an angle other than ninety degrees to form a modular storage unit of varying shapes and sizes. For example, if the angle formed by the first and second segments of the inner and outer walls was 60 degrees, the coupler clip could be used to form a triangular storage unit using three coupler clips at the front and at the back of the panels.

As shown in FIG. 4, side panels 3, 3 top panel 2a and bottom panel 2b may each include a groove 10 for securing the back panel 5 (not shown). In some embodiments, the module may not include back panel 5. In such case, grooves 10 may be absent from the inner walls of the side, top and bottom panels. Grooves 6 for optional shelves 9 are also visible on side panels 3, 3. Grooves 6 may extend only part of the length of each side panel 3 as shown in FIG. 4 so that when the modular storage unit is assembled, shelves 9 are kept in place by grooves 6 as shown in FIG. 1B. Alternatively, grooves 6 may extend along the length of each side panel 3 allowing the shelves to be inserted into the modular storage unit. In another embodiment, optional shelves 9 are kept in place using one or more dowels (not shown) in lieu of grooves 6. The dowels may be placed in the appropriate holes (not shown) both in optional shelves 9 and side panels 3, 3 to support optional shelves 9. Each of side panels 3, 3, top panel 2a and bottom panel 2b contain grooves 14 which are constructed to slidably receive tongues 13 of coupler clip 1. When coupler clips 1 (not shown) are slidingly engaged with the front and rear corners of the modular storage unit, the interaction between the tongues 13 and the grooves 6 provide a secure connection maintaining the side panels 3, 3 in engagement with the top panel 2a and the bottom panel 2b thereby forming a storage unit.

When shelves 9 (not shown) are added and back panel 5 inserted, the storage unit shown in FIG. 1B is provided. In an alternative construction, grooves similar to grooves 14 may be provided on the top panel 2a and bottom panel 2b and vertical panels can be engaged in the grooves to provide dividers.

Figure 5:
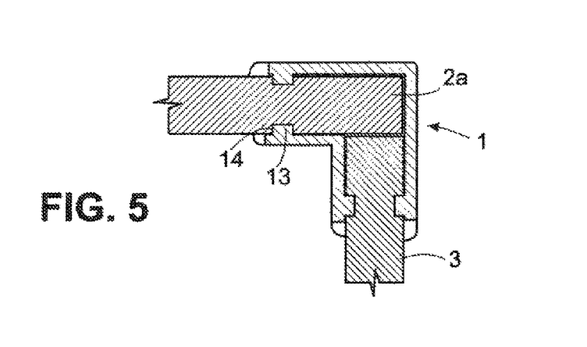
FIG. 5 is a partial section view of the coupler clip taken along the line 5-5 in FIG. 1C in the direction shown by the arrows.

The section view of FIG. 5 illustrates coupler clip 1 engaged with top panel 2a and side panel 3 to secure the panels in place. Tongue 13 is visibly engaged with groove 14 thereby preventing top panel 2a from separating from side panel 3. The end of side panel 3 is flush against the end portion of the side of top panel 2a, absent any structure between the panels to provide as tight a fit as possible.

Figure 6:
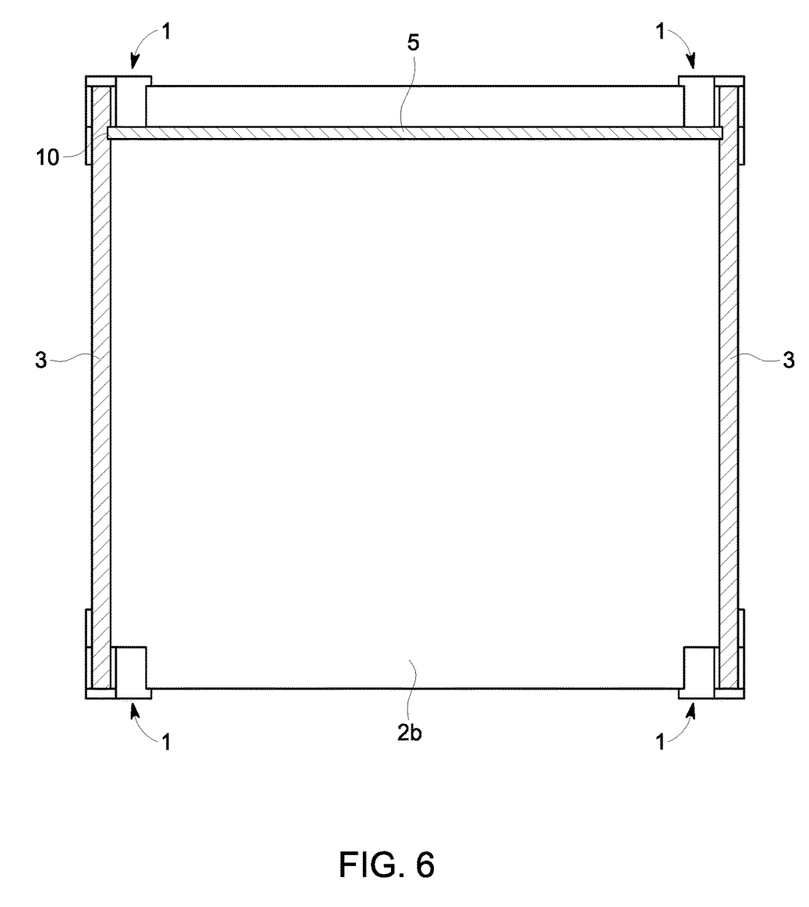
FIG. 6 is a section view of the modular storage unit taken along the line 6-6 in FIG. 1C in the direction shown by the arrows.

The section view of FIG. 6 illustrates the interconnection between side panels 3, 3 bottom panel 2b and back panel 5. Back panel 5 is shown held in place by grooves 10 in side panels 3, 3. Side panels 3, 3 are connected to top panel 2a (not shown) and bottom panel 2b through the use of coupler clips 1. Tongues 13 and grooves 14 of coupler clip 1 (not visible in FIG. 6) are engaged to join side panels 3, 3 to bottom panel 2b and top panel 2a (not shown).

The panels of the modular storage unit can be of any material, preferably one where the fabrication of grooves for the optional shelves, the back panel and the coupler clip would be relatively easy. Exemplary materials include wood, particle board, and plastic. However, a great variety of materials may be used in constructing the panels. Such material selection would be obvious to those skilled in the art.

Similarly, the coupler clip and connector unit can be made of any material, preferably one where the fabrication of the coupler clip, the bore and tongues can be easily fabricated. However, a great variety of materials may be used in constructing the coupler clips. Such material selection would be obvious to those skilled in the art. The coupler clips may be molded, cut, printed or otherwise fabricated.

Many variations may be made from the specific embodiments shown. For example, while the modular storage unit shown is a cube, by increasing the length of side panels 3, 3 top panel 2a and bottom panel 2b, while maintaining the size of back panel 5, it is possible to form a modular storage unit in the shape of a rectangular prism. One of ordinary skill in the art would be able to create other shapes using coupler clip 1 and panels with grooves to permit a secure connection between the coupler clip and the panels. Similarly, although the modular storage unit is described herein as either having smooth sides or horizontal shelves, it should be understood that the present invention can be utilized with modular storage units having different constructions including without limitation vertical partitions, single or double doors, drawers, combinations of drawers and shelves and other known variations.

Further the number, location and placement of grooves 6 for the placement of optional shelving 9 can be varied. The number of grooves 6 and shelving 9 can also be varied as desired.

Now that embodiments of the present invention have been shown and described in detail, various modifications and improvements thereon will become readily apparent to those skilled in the art. Accordingly, the exemplary embodiments of the invention, as set forth above, are intended to be illustrative, not limiting. The spirit and scope of the present invention is to be construed broadly.

The invention claimed is:
1. A modular storage unit comprising:
 a first and second side panel of equal dimension, each panel having a first thickness;
 a top and bottom panel of equal dimension, each panel having a second thickness;
 eight coupler clips, each coupler clip for engagement of the first or second side panel and the top or bottom panel by sliding insertion in a direction;
 wherein at least one of the coupler clips comprises
 an inner wall having an inner and outer surface and a length wherein the length of the inner wall contains a first segment and a second segment which form an angle of approximately 90 degrees at their intersection;
 an outer wall having an inner and outer surface and a length wherein the length of the outer wall contains a first segment and a second segment which form an angle of approximately 90 degrees at their intersection;

the first segment of the inner and outer walls spaced from each other a distance substantially equal to the thickness of the corresponding panel of the modular storage unit;

the second segment of the inner and outer walls spaced from each other a distance substantially equal to the thickness of the corresponding panel of the modular storage unit;

at least one of the first segment of the inner surface of the inner wall and the first segment of the inner surface of the outer wall contain a projecting tongue extending only longitudinally in the direction of insertion facing the opposing inner surface and projecting laterally a distance less than a distance equal to the thickness of the corresponding panel of the modular storage unit;

at least one of the second segment of the inner surface of the inner wall and the second segment of the inner surface of the outer wall contain a projecting tongue extending only longitudinally in the direction of insertion facing the opposing inner surface and projecting laterally a distance less than a distance equal to the thickness of the corresponding panel of the modular storage unit;

a cap integrally formed with one end of the inner and outer walls;

and wherein each side panel and each top and bottom panel contains longitudinal grooves extending from the perimeter of each panel in corresponding locations and of corresponding lengths and depths so that the projecting tongues of the coupler clip are slidably engageable with the longitudinal grooves of each panel when the panels are engaged using eight coupler clips;

wherein when the first or second side panel and the top or bottom panel are engaged with the coupler clip, an end of the first or second panel or the top or bottom panel is flush against an end portion of the side of the respective panel it is engaged with.

2. The modular storage unit of claim 1, wherein the at least one coupler clip further comprises:

the inner surface of the inner wall containing at least one projecting tongue extending only longitudinally in the direction of insertion on the first segment of the inner wall and projecting laterally a distance less than a distance equal to the thickness of the corresponding panel of the modular storage unit and at least one projecting tongue extending only longitudinally in the direction of insertion on the second segment of the inner wall both facing the inside of the outer wall and projecting laterally a distance less than a distance equal to the thickness of the corresponding panel of the modular storage unit;

the inner surface of the outer wall containing at least one projecting tongue extending only longitudinally in the direction of insertion on the first segment of the outer wall and projecting laterally a distance less than a distance equal to the thickness of the corresponding panel of the modular storage unit and at least one projecting tongue extending only longitudinally in the direction of insertion on the second segment of the outer wall both facing the inside of the inner wall and projecting laterally a distance less than a distance equal to the thickness of the corresponding panel of the modular storage unit.

3. The modular storage unit of claim 2 further comprising:

a back panel sufficiently sized to fit between the top and bottom panels and side panels;

wherein the top and bottom panels and two side panels contain lateral grooves in corresponding locations so that the back panel may be secured within the grooves of the top and bottom panels and two side panels when the panels are connected using eight coupler clips.

4. The modular storage unit of claim 1 further comprising:

a back panel sufficiently sized to fit between the top and bottom panels and side panels;

wherein the top and bottom panels and two side panels contain lateral grooves in corresponding locations so that the back panel may be secured within the grooves of the top and bottom panels and two side panels when the panels are connected using eight coupler clips.

5. The modular storage unit of claim 1 wherein the first or second side panel and the top or bottom panel are engaged with the coupler clip.

6. An assembly comprising:

a first panel having a first thickness;

a second panel having a second thickness;

a coupler clip for engagement of the first and second panels by sliding insertion in a direction;

wherein the coupler clip comprises an inner wall having an inner and outer surface and a length wherein the length of the inner wall contains a first segment and a second segment which form an angle of approximately 90 degrees at their intersection;

an outer wall having an inner and outer surface and a length wherein the length of the outer wall contains a first segment and a second segment which form an angle of approximately 90 degrees at their intersection;

the first segment of the inner and outer walls spaced from each other a distance substantially equal to the thickness of a first panel of the assembly;

the second segment of the inner and outer walls spaced from each other a distance substantially equal to the thickness of a second panel of the assembly;

at least one of the first segment of the inner surface of the inner wall and the first segment of the inner surface of the outer wall contain a projecting tongue extending only longitudinally in the direction of insertion facing the opposing inner surface and projecting laterally a distance less than a distance equal to the thickness of the first panel of the assembly;

at least one of the second segment of the inner surface of the inner wall and the second segment of the inner surface of the outer wall contain a projecting tongue extending only longitudinally in the direction of insertion facing the opposing inner surface and projecting laterally a distance less than a distance equal to the thickness of the second panel of the assembly;

a cap integrally formed with one end of the inner and outer walls;

and wherein the first and second panels each contains longitudinal grooves extending from the perimeter of each panel in corresponding locations and of corresponding lengths and depths so that the projecting tongues of the coupler clip are slidably engageable with the longitudinal grooves of each panel when the panels are engaged with the one coupler clip;

wherein when the first and second panels are engaged with the coupler clip, an end of the first or second panel is flush against an end portion of the side of the respective panel it is engaged with.

7. The assembly of claim 6, wherein at least one of the tongues of the coupler clip extends substantially perpendicular to the cap.

8. The assembly of claim 7, wherein the first segment of the outer wall of the coupler clip has a hole of sufficient diameter to receive a connector pin.

9. The assembly of claim 8 wherein the second segment of the outer wall of the coupler clip has a hole of sufficient diameter to receive a connector pin.

10. The assembly of claim 6, wherein the spaces between the first and second segments of the inner and outer walls of the coupler clip are substantially the same.

11. The assembly of claim 6, wherein the spaces between the first and second segments of the inner and outer walls of the coupler clip are different.

12. The assembly of claim 6 wherein the first and second panels are engaged with the coupler clip.

\* \* \* \* \*